United States Patent
Inoue

(10) Patent No.: US 9,752,448 B2
(45) Date of Patent: Sep. 5, 2017

(54) BRUSH SEAL

(71) Applicant: EAGLE INDUSTRY CO., LTD., Minato-ku, Tokyo (JP)

(72) Inventor: Hideyuki Inoue, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 58 days.

(21) Appl. No.: 14/380,910

(22) PCT Filed: Feb. 28, 2013

(86) PCT No.: PCT/JP2013/055316
§ 371 (c)(1),
(2) Date: Aug. 25, 2014

(87) PCT Pub. No.: WO2013/153867
PCT Pub. Date: Oct. 17, 2013

(65) Prior Publication Data
US 2015/0167483 A1 Jun. 18, 2015

(30) Foreign Application Priority Data
Apr. 8, 2012 (JP) .................................. 2012-087999

(51) Int. Cl.
*F16J 15/44* (2006.01)
*F01D 11/00* (2006.01)
(Continued)

(52) U.S. Cl.
CPC .......... *F01D 11/005* (2013.01); *F01D 11/001* (2013.01); *F01D 11/003* (2013.01);
(Continued)

(58) Field of Classification Search
CPC ......... F01D 11/003; F01D 11/005; F02C 7/28
See application file for complete search history.

(56) References Cited

U.S. PATENT DOCUMENTS

| | | | | |
|---|---|---|---|---|
| 5,201,530 A | * | 4/1993 | Kelch | F16J 15/3288 277/355 |
| 6,343,792 B1 | * | 2/2002 | Shinohara | F01D 11/001 277/345 |

(Continued)

FOREIGN PATENT DOCUMENTS

| | | |
|---|---|---|
| CN | 2534428 Y | 2/2003 |
| EP | 1052438 A2 | 11/2000 |

(Continued)

OTHER PUBLICATIONS

International Search Report (ISR) mailed May 21, 2013, issued for International application No. PCT/JP2013/055316.

(Continued)

*Primary Examiner* — Vishal Patel
*Assistant Examiner* — Thomas Neubauer
(74) *Attorney, Agent, or Firm* — Law Office of Katsuhiro Arai

(57) ABSTRACT

A brush seal includes a bristle part formed by multiple bristles such that the multiple bristles arranged in a direction of pressure difference between a high-pressure side and a low-pressure side are mutually fixed between a base end and a free end to form planar bristles, wherein these planar bristles are arranged continuously in layers in a circumferential direction to form a circular bristle part. Multiple dynamic-pressure generating grooves that generate dynamic pressure by turning and sliding relative to a rotational part are formed independently in the circumferential direction, on the sliding surface of the bristle part on the free end side, in a manner open to the high-pressure side.

3 Claims, 4 Drawing Sheets

(51) Int. Cl.
F02C 7/28 (2006.01)
F16J 15/3288 (2016.01)
F16J 15/22 (2006.01)
F01D 11/12 (2006.01)

(52) U.S. Cl.
CPC ............. F01D 11/12 (2013.01); F02C 7/28 (2013.01); F16J 15/22 (2013.01); F16J 15/3288 (2013.01); *F05D 2240/56* (2013.01)

(56) References Cited

U.S. PATENT DOCUMENTS

| | | | |
|---|---|---|---|
| 7,159,872 B2* | 1/2007 | Nicholson | F16J 15/442 277/355 |
| 2003/0001339 A1 | 1/2003 | Inoue | |
| 2003/0151206 A1* | 8/2003 | Smith | A46B 3/02 277/355 |
| 2012/0003084 A1* | 1/2012 | Matwey | F01D 11/02 415/198.1 |
| 2013/0313782 A1* | 11/2013 | Jahn | F16J 15/3292 277/309 |

FOREIGN PATENT DOCUMENTS

| | | |
|---|---|---|
| JP | 2001-073708 A | 3/2001 |
| JP | 2001-182646 A | 7/2001 |
| JP | 2003-014128 A | 1/2003 |
| JP | 2003-343731 A | 12/2003 |
| JP | 2003343730 A | 12/2003 |
| JP | 2008-121512 A | 5/2008 |
| WO | 00/03164 A1 | 1/2000 |

OTHER PUBLICATIONS

Notification of Transmittal of Translation of the International Preliminary Report on Patentability (PCT/IB/338) mailed Oct. 23, 2014, with International Preliminary Report on Patentability (PCT/IB/373) and Written Opinion of the International Searching Authority (PCT/ISA/237), for corresponding international application PCT/JP2013/055316.

An Office Action issued by the State Intellectual Property Office of China, mailed Jul. 16, 2015, with a search report for Chinese counterpart application No. 201380009182.2.

A Second Notification of Reason for Refusal issued by the State Intellectual Property Office of China, mailed Mar. 25, 2015, with a search report for Chinese counterpart application No. 201380009182.2.

* cited by examiner

BRUSH SEAL

This application is the U.S. National Phase under 35 U.S.C. §371 of International Application PCT/JP2013/055316, filed Feb. 28, 2013, which claims priority to Japanese Patent Application No. 2012-087999, filed Apr. 8, 2012. The International Application was published under PCT Article 21(2) in a language other than English.

TECHNICAL FIELD

The present invention relates to a brush seal for providing a seal between a rotational axis and its mating part that undergo relative motion in an airplane, gas turbine, steam turbine, etc., for example.

BACKGROUND ART

Sealing mechanisms are provided around a rotational axis in a gas turbine to prevent gas from leaking to the low-pressure side from the high-pressure side, for example.

Labyrinth seals, which are non-contact seals, have traditionally been used for these sealing mechanisms, but as labyrinth seals make no contact, there are limits to how much their sealing performance can be improved. Accordingly, brush seals are now being used to achieve greater sealing performance.

A brush seal comprises multiple bristles formed into a ring shape (brush seal bristles), and the tips of these brush seal bristles contact the rotating side to provide a seal.

The rotating side, such as a rotor in a gas turbine, deforms due to centrifugal force and heat as the turbine operates, while the housing, which is the stationary side, also expands due to heat, and consequently the distance between the brush seal and rotor changes.

This distance change is absorbed by the deflection of bristles, but since deflection of bristles toward the low-pressure side can cause the sealing performance to drop, a back plate is provided on the low-pressure side of brush seal bristles to prevent them from deflecting toward the low-pressure side. Additionally, a space is provided on the high-pressure side of bristles to allow for deflection of bristles. (Refer to FIGS. 8 to 10 on Page 10 of Patent Literature 1, for example.)

If a brush seal is used in a high-pressure area in a steam turbine, etc., however, its bristles will flap, especially on the high-pressure side, and eventually break.

If bristles break, the broken bristles will no longer contact the rotor, thereby causing the sealing performance of the brush seal to drop.

A drop in the sealing performance of the brush seal can lead to a problem of lower output from the turbine, for example.

To eliminate the flapping of bristles on the high-pressure side, solutions are proposed that involve providing a braking plate also on the high-pressure side of brush seal bristles to limit the deflection of brush seal bristles, while providing through holes in the braking plate to restrain generation of turbulent flows and particularly prevent the bristles from flapping on the high-pressure side. (Refer to Patent Literature 2, for example.)

However, the solution described in Patent Literature 2 is such that the movement of brush seal bristles is strongly restricted all the way until near the rotor by the back plate on the low-pressure side and braking plate on the high-pressure side, resulting in a shorter free deflection length of brush seal bristles.

This increases the rigidity of brush seal bristles and raises their contact pressure with the rotor, which in turn presents a problem of increased wear of the bristles and rotor in a steady state.

To solve the problems of the solution described in Patent Literature 2, solutions are proposed that involve providing restraining bristles having just enough elasticity not to prevent the deformation of the bristle part upon contact, instead of the braking plate on the high-pressure side of bristles. (Refer to Patent Literature 3, for example.)

This brush seal described in Patent Literature 3 absorbs any change in the interval between the stationary part and rotational part by the deflection of the bristle part, and because the movement of the bristle part is suppressed by the back plate on the low-pressure side, these bristles deflect in the direction of the restraining bristles; since the restraining bristles have just enough elasticity not to prevent the deformation of the bristle part upon contact, the restraining bristles undergo elastic deformation and thereby absorb the deformation of the bristle part, and consequently any increase in wear can be prevented in a steady state without increasing the contact friction force as the interval between the stationary part and rotational part changes.

However, the brush seal described in Patent Literature 3 presents a problem of high manufacturing cost because restraining bristles formed by bundled wires (bristles) must be provided on the high-pressure side of the bristle part.

PRIOR ART LITERATURES

Patent Literatures

Patent Literature 1 Japanese Patent Laid-open No. 2003-14128 (FIG. 8 on Page 10)
Patent Literature 2 Japanese Patent Laid-open No. 2001-73708
Patent Literature 3 Japanese Patent Laid-open No. 2008-121512

SUMMARY OF INVENTION

Problems to be Solved by Invention

The present invention was developed to solve the aforementioned problems of prior arts and the object of the present invention is to provide a brush seal of simple configuration that increases the rigidity of bristles in the direction of pressure difference between the high-pressure side and low-pressure side, while decreasing the rigidity in the direction orthogonal to the direction of pressure difference and thereby reducing the wear of bristles, and also reduces the leakage of sealed fluid.

Means to Solve Problems

To achieve the aforementioned object, firstly, the brush seal proposed by the present invention is a brush seal having: a bristle part formed by multiple bristles attached to a stationary part between the stationary part and a rotational part that undergo relative motion by maintaining a space in between; and a back plate attached adjacent to the bristle part on a low-pressure side to restrict the movement of the bristle part, wherein such brush seal for sealing the fluid flowing between the stationary part and the rotational part is characterized in that the bristle part formed by multiple bristles is such that the multiple bristles arranged in the direction of pressure difference between the high-pressure side and low-pressure side are mutually fixed between the base end and free end to form planar bristles, and these planar bristles are arranged continuously in layers in the circumferential direction to form the bristle part; and wherein multiple dynamic-pressure generating grooves that generate dynamic pressure by rotating and sliding relative to the rotational part are formed independently in the circumferential direction, on a sliding surface of the bristle part on the free end side, in a manner open to the high-pressure side.

According to these characteristics, this brush seal provides higher rigidity in the direction of pressure difference between the high-pressure side and low-pressure side (=axial direction of the rotor) compared to when conventionally known brush seal bristles are used, and thus can be applied to steam turbines and other high-pressure equipment.

Additionally, since degrees of freedom of the tips of bristles are ensured in the direction orthogonal to the direction of pressure difference (=circumferential direction), their rigidity is low in the direction orthogonal to the direction of pressure difference and therefore the free end can separate from the outer periphery surface of the rotational part due to the dynamic pressure of the rotational part even when it is rotating at low speed, resulting in reduced wear and improved wear resistance.

Furthermore, the ability of the tips of bristles to move independently of the conical vibration of the rotational part (=vibration generated by the tilting of the axis) also helps to reduce wear and improve wear resistance.

Furthermore, the hydrodynamic force generated by the fluid shear force resulting from the rotation of the rotational part generates a pumping force that pushes fluid back toward the high-pressure side, which reduces the leakage of sealed fluid.

Furthermore, the generated hydrodynamic force produces buoyancy in the bristles and thus reduces the wear of bristles further.

Secondly, the brush seal proposed by the present invention is characterized in that, in the first characteristics, the dynamic-pressure generating grooves are formed by arranging continuously in layers in the circumferential direction planar bristles that comprise, among the multiple bristles arranged in the direction of pressure difference between the high-pressure side and low-pressure side, bristles whose height is short on the free end side and which are arranged on the high-pressure side, where the planar bristles are arranged sequentially, starting from planar bristles having many short bristles that are arranged on the high-pressure side and generally changing to planar bristles having fewer short bristles toward a rotating direction of the rotational part.

According to these characteristics, dynamic-pressure generating grooves can be formed with ease by arranging bristles of different heights.

Thirdly, the brush seal proposed by the present invention is characterized in that, in the second characteristics, the dynamic-pressure generating grooves are shaped in an approximate triangle in plan view which triangle has one side facing the high-pressure side and one other side slanting in a manner giving a component of force directed toward the high-pressure side to the flow generated by the rotation of the rotational part, and the dynamic-pressure generating grooves are shaped in a stepped concave in side view.

According to these characteristics, the pumping force generated by the dynamic-pressure generating grooves allows the fluid to be efficiently pushed back toward the high-pressure side.

Effects of Invention

The invention described in the present application for patent provides higher rigidity in the direction of pressure difference between the high-pressure side and low-pressure side (=axial direction of the rotor) compared to when conventionally known brush seal bristles are used, and thus can be applied to steam turbines and other high-pressure equipment.

In addition, since degrees of freedom are ensured at the tips of bristles in the direction orthogonal to the direction of pressure difference (=circumferential direction), rigidity is low in the direction orthogonal to the direction of pressure difference and therefore the free end can separate from the outer periphery surface of the rotational part due to the dynamic pressure even when the rotational part is rotating at low speed, resulting in reduced wear and improved wear resistance.

Furthermore, the ability of the tips of bristles to move independently of the conical vibration of the rotational part also helps reduce wear and improve wear resistance.

Furthermore, the hydrodynamic force generated by the fluid shear force resulting from the rotation of the rotational part generates a pumping force that pushes fluid back toward the high-pressure side, which reduces the leakage of sealed fluid.

Furthermore, the generated hydrodynamic force produces buoyancy in the bristles and thus reduces the wear of bristles further.

MODES FOR CARRYING OUT THE INVENTION

Figure 1:
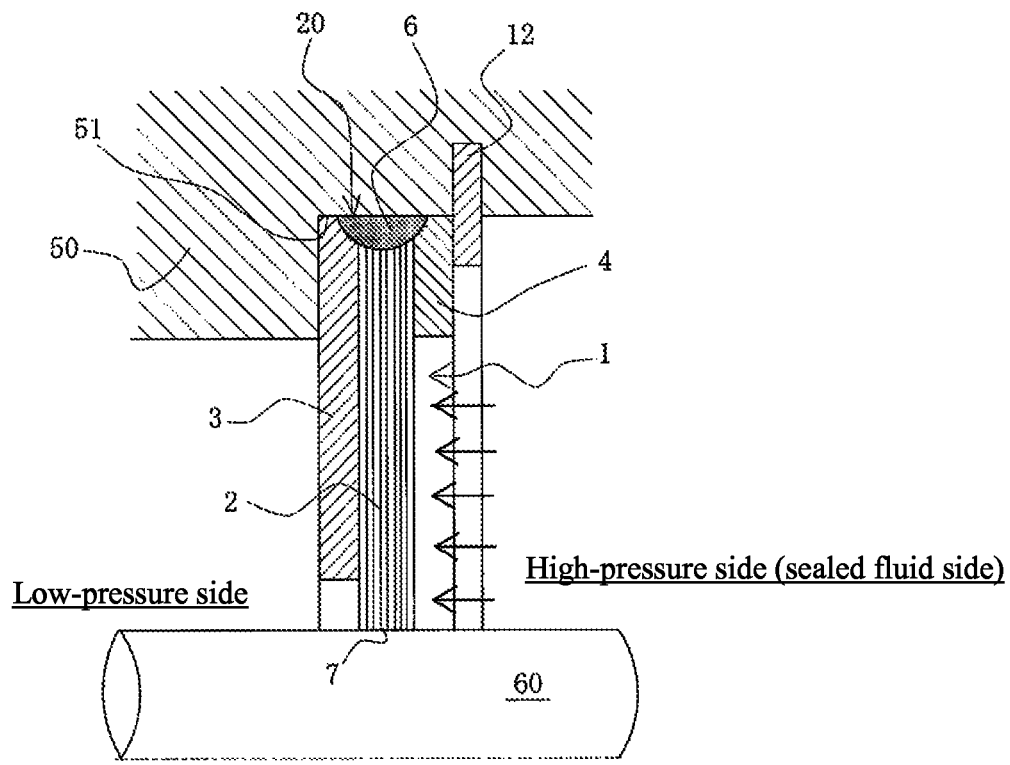
FIG. 1 is a longitudinal section view showing the top half of a brush seal pertaining to an embodiment of the present invention

A mode for carrying out brush sealing pertaining to the present invention is explained in detail by referring to the drawings, but it should be noted that the present invention is not interpreted only according to the foregoing and that various changes, modifications and improvements can be added based on the knowledge of those skilled in the art so long as they do not deviate from the scope of the present invention.

FIG. 1 is a longitudinal section view showing the top half of a brush seal pertaining to an embodiment of the present invention.

In FIG. 1, a brush seal device 1 is formed in a ring shape and its fixed part 20 on the outer periphery side is attached, via a snap ring 12, to a step 51 provided on the inner periphery surface of a casing 50 which is a component of one section of the constituent components.

Also, the inner periphery side of the brush seal device 1 is provided in a manner opposingly contacting or positioned close to the outer periphery surface of a rotor 60 which is a component of the other section. And, the brush seal device 1 seals leakage of the sealed fluid to the low-pressure side from the high-pressure side.

Note that the casing 50 constitutes the stationary part of the present invention, while the rotor 60 constitutes the rotational part of the present invention.

On the low-pressure side of a bristle part 2 which is a key component member of this brush seal device 1, a circular back plate 3 is provided in contact with the bristle part 2 and supports the bristle part 2 against the pressure of the sealed fluid acting upon it.

On the surface of the bristle part 2 on the high-pressure side, a retention part 4 is formed as a ring plate and positioned integrally with the back plate 3 so as to sandwich a base end 6 of the bristle part 2 on the outer periphery side between itself and the back plate 3. This retention part 4 is tapered widthwise in the diameter direction to expose the bristle part 2 so that the sealed fluid can act upon the side faces of the bristle part 2.

Also, the back plate 3 and the base end 6 and retention part 4 of the bristle part 2 are welded to the outer periphery to constitute the fixed part 20, which is fixed to the step 51 provided on the inner periphery surface of the casing 50.

The bristle part 2 is formed by tens to hundreds of thousands of bristles (coarse hairs) 5 arranged from the outer periphery side toward the inner periphery side, where multiple bristles are arranged in the direction of pressure difference between the high-pressure side and low-pressure side to form a specified width, while multiple bristles 5 forming a specified width are also arranged continuously in the circumferential direction in a circular shape.

In addition, a free end 7 of the bristles 5 on the inner periphery side is provided in a manner opposingly contacting or positioned close to the outer periphery surface of the rotor 60 which is the other component.

The wire diameter of bristles 5 is generally 0.02 mm to 0.5 mm. For the material of bristles 5, steel, stainless steel or nickel alloy, heat-resistant cobalt alloy, or the like, is used. Also, the cross-section shape of bristles 5 may be oval, triangle, square or other polygon in addition to circle.

Figure 2:
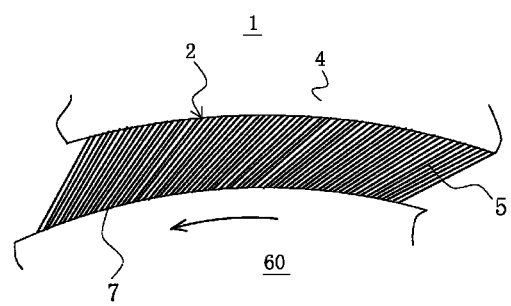
FIG. 2 is a front view of the brush seal in FIG. 1 as viewed from the high-pressure side

FIG. 2 is a front view of the brush seal in FIG. 1 as viewed from the high-pressure side.

The brush seal 1 in FIG. 2 is in a normal state where the brush seal 1 and rotor 60 are not shaking, and its bristles 5 are arranged straight in a manner tilting in the rotating direction of the rotor 60. In this normal state of the brush seal 1, the free end 7 of the bristles 5 is contacting or positioned close to the outer periphery surface of the rotor 60.

Figure 3:
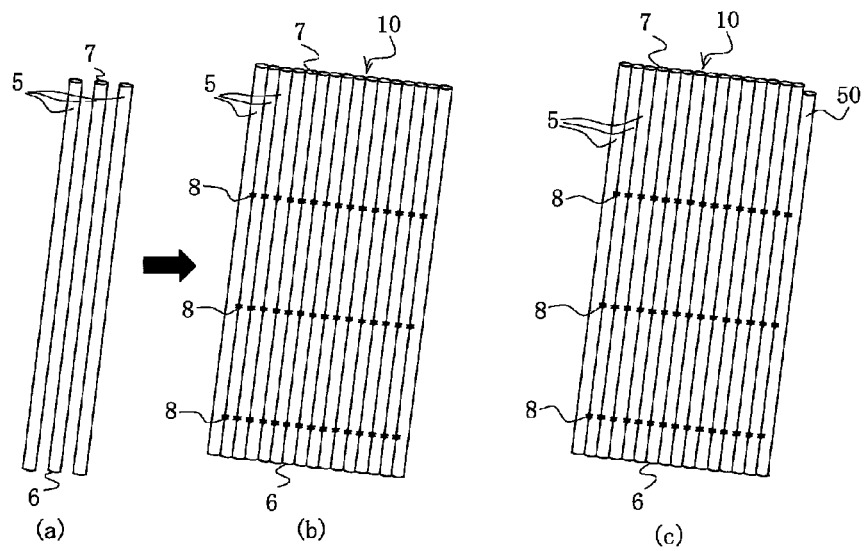
FIG. 3 is a perspective view explaining the process of forming a bristle part pertaining to an embodiment of the present invention

FIG. 3 is a perspective view explaining the process of forming a bristle part pertaining to an embodiment of the present invention, and dynamic-pressure generating grooves are not provided on the sliding surface of the bristle part in (a) and (b), while dynamic-pressure generating grooves are provided on the sliding surface of the bristle part in (c).

Note that the top side of FIG. 3 represents the free end side of the bristle part that slides with the rotational part, while the bottom side represents the base end side (stationary part side).

In FIG. 3, the number of bristles shown arranged in the direction of pressure difference between the high-pressure side and low-pressure side is less than the actual number for the purpose of illustration, but in reality hundreds of bristles are arranged to form a specified width.

As shown in FIG. 3 (*a*), multiple bristles 5 having a circular cross-section shape and specified length are prepared. Next, the multiple bristles 5 are arranged in a single row in such a way that a specified width is formed in the direction of pressure difference between the high-pressure side and low-pressure side and that the bristles 5 positioned side by side contact each other, as shown in FIG. 3 (*b*). Then, the bristles 5 positioned side by side are fixed by means of welding, fusion, etc., between the base end 6 and free end 7.

In FIG. 3 (*b*), three fixed parts 8 are provided in the diameter direction between the base end 6 and free end 7. However, the number of fixed parts 8 in the diameter direction is not at all limited to three, as long as at least one fixed part is provided, and any location (s) and number of fixed part (s) can be set according to the required rigidity of the bristle part 2. Among the fixed parts 8, the position of the fixed part 8 close to the free end 7 is important in determining the rigidity at the free end of bristles 5.

As described above, the multiple bristles 5 mutually fixed at the center in the diameter direction are formed in a planar shape to form planar bristles 10, as shown in FIG. 3 (*b*).

The planar bristles 10 shown in FIG. 3 (*c*) are such that, among the multiple bristles 5 forming a specified width, bristles 50 at the right end are shorter on the free end side. Although FIG. 3 (*c*) shows short bristles 50 arranged at the right end, various planar bristles 10 having different numbers of short bristles 50 arranged not only at the right end, but also in other locations from the right end toward the left end, are prepared.

Methods to lower the heights of some bristles on the free end side include, among others, a method to form planar bristles 10 by arranging bristles of the same height and then cutting the bristles in specified positions on the free end side, as shown in FIG. 3 (*b*), and a method to prepare short bristles 50 beforehand and, when arranging multiple bristles in a single row, arrange the short bristles 50 in specified positions and then fix the bristles positioned side by side.

The aforementioned planar bristles 10 are arranged continuously in layers in the circumferential direction with the bristles 5 contacting or positioned close to the outer periphery surface of the rotor 60 at the free end 7, to form the circular bristle part 2 shown in FIG. 2.

The planar bristles 10 thus formed provide higher rigidity in the direction of pressure difference between the high-pressure side and low-pressure side (=axial direction of the rotor) compared to when conventionally known brush seal bristles are used, and thus can be applied to steam turbines and other high-pressure equipment.

In addition, since degrees of freedom are ensured at the tips of individual bristles 5, or specifically at the tips of individual bristles 5 between the fixed part 8 close to the free end 7 and the free end 7, in the direction orthogonal to the direction of pressure difference (=circumferential direction), rigidity is low in the direction orthogonal to the direction of pressure difference and therefore the free end 7 can separate from the outer periphery surface of the rotor 60 due to the dynamic pressure even when the rotor 60 is rotating at low speed, which provides such benefits as reduced wear and improved wear resistance.

Furthermore, the ability of the tips of individual bristles 5 to move independently of the conical vibration of the rotor 60 also helps reduce wear and improve wear resistance.

Figure 4:
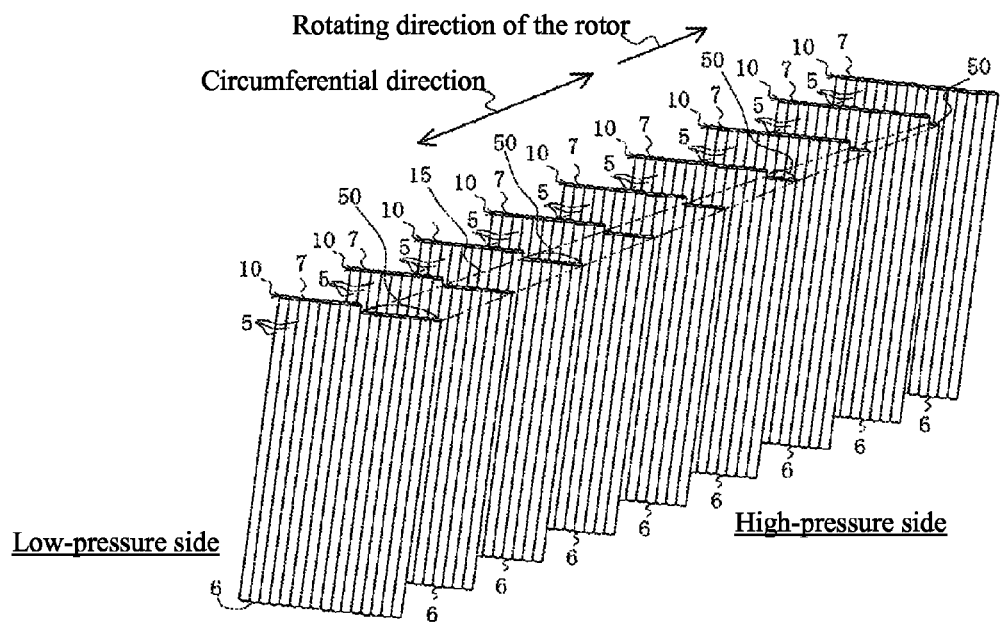
FIG. 4 is a perspective view explaining the process of forming dynamic-pressure generating grooves provided on the sliding surface of a bristle part pertaining to an embodiment of the present invention

Next, the process of forming dynamic-pressure generating grooves on the sliding surface of the bristle part when planar bristles are layered in the circumferential direction is explained by referring to FIG. 4. In FIG. 4, the top side of the drawing represents the free end side of bristles that slide with the rotational part, while the bottom side represents the base end side (stationary part side). Also note that the direction connecting the front left and rear right of the drawing represents the circumferential direction. Furthermore, the right side of the drawing represents the high-pressure side, while the left side represents the low-pressure side.

In FIG. 4, multiple numbers of various planar bristles 10 having different numbers of short bristles 50 arranged on the high-pressure side are prepared and arranged in the circumferential direction.

Here, planar bristles 10 that have short bristles 50 on the high-pressure side are continuously arranged in layers in the circumferential direction among the multiple bristles 5 arranged in the direction of pressure difference between the high-pressure side and low-pressure side, and these planar bristles 10 are arranged sequentially toward the rotating direction of the rotor 60, starting from planar bristles having many short bristles 50 arranged on the high-pressure side and followed by planar bristles having fewer short bristles. As a result, dynamic-pressure generating grooves 15 are formed on the surface on the free end side of the planar bristles 10 layered in the circumferential direction, where the shape of each groove in plan view forms an approximate triangle narrowing toward the rotating direction of the rotor 60 and connected to the high-pressure side, and its shape in side view is a stepped concave.

Figure 5:
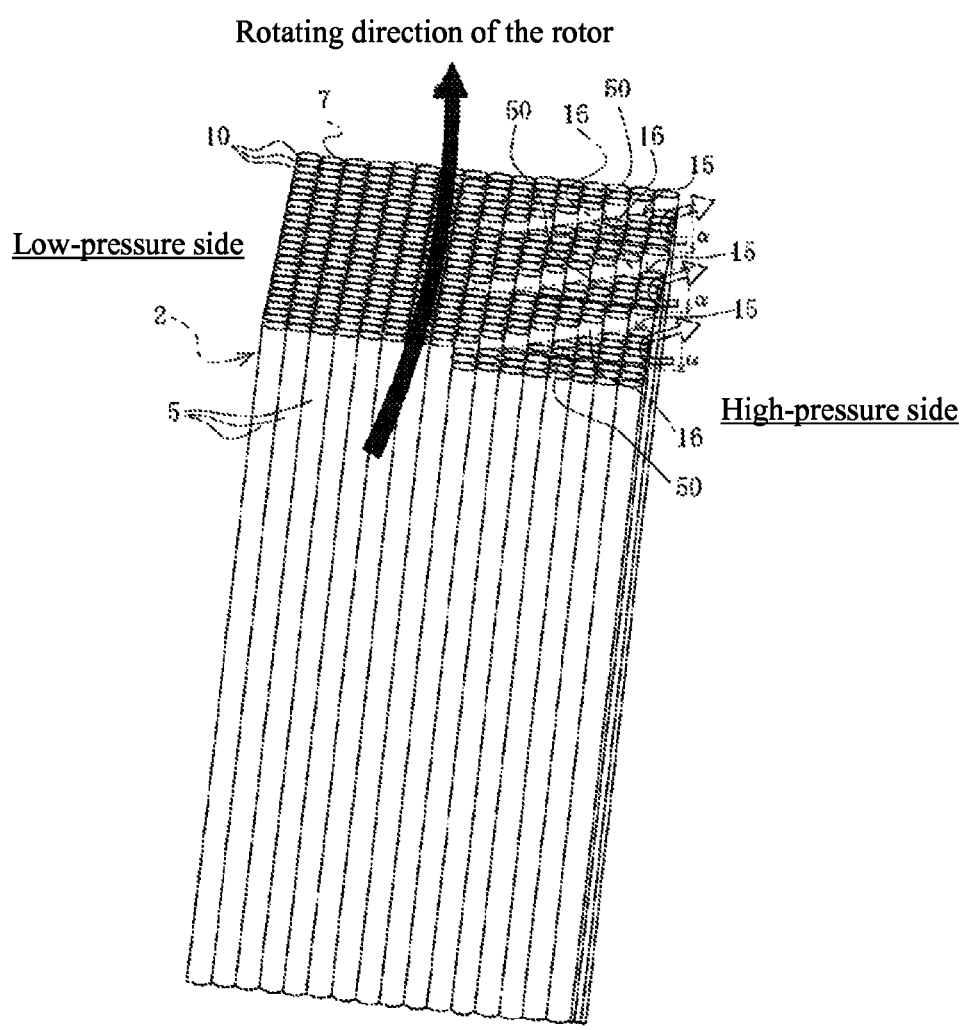
FIG. 5 is a drawing explaining dynamic-pressure generating grooves formed on the sliding surface of a bristle part pertaining to an embodiment of the present invention

FIG. 5 is a drawing explaining dynamic-pressure generating grooves formed on the sliding surface of a bristle part pertaining to an embodiment of the present invention, where apart of a circular bristle part 2 is shown. The top side of the drawing represents the free end side of bristles 5 that slide with the rotor 60, while the bottom side represents the base end side (stationary part side). Also note that the direction from the front toward the rear of the drawing represents the rotating direction of the rotor 60. Furthermore, the right side of the drawing represents the high-pressure side, while the left side represents the low-pressure side.

In FIG. 5, the circular bristle part 2 is formed by arranging continuously in layers in the circumferential direction bristles 10 having multiple bristles 5 arranged in the direction of pressure difference between the high-pressure side and low-pressure side, and on the sliding surface of the circular bristle part 2 on the free end 7, multiple dynamic-pressure generating grooves 15 that generate dynamic pressure by turning and sliding relative to the rotor 60 are formed independently in the circumferential direction in a manner connecting to the high-pressure side. These dynamic-pressure generating grooves 15 are formed in such a way that their shape in plan view forms an approximate triangle while their shape in side view is a stepped concave, by selecting multiple planar bristles 10 and arranging them in the circumferential direction so that the number of arranged short bristles 50 gradually decreases toward the rotating direction of the rotor 60. Each such stepped concave of approximate triangle shape is formed independently in the circumferential direction, where one of the three sides connects to the high-pressure side, while the remaining two sides, or specifically the bottom side and slanting side in the direction of pressure difference do not connect the low-pressure side, but they are connected to both ends of the one side on the high-pressure side and at an intersecting point along the width direction of the planar bristle 10.

In addition, of the three sides of the triangle forming the dynamic-pressure generating groove 15, the slanting sides corresponding to the step 16 are slanting with respect to the bottom side by the angle α in the rotating direction of the rotor 60 so as to give a component of force directed toward the high-pressure side to a flow generated by the rotation of the rotor 60. As a result, the hydrodynamic force generated by the fluid shear force resulting from the rotation of the rotor 60 generates a pumping force that pushes fluid back toward the high-pressure side, which reduces the leakage of sealed fluid. Furthermore, the generated hydrodynamic force collides against the slanted step 16 of the dynamic-pressure generating groove 15 to produce buoyancy in the bristles 5 and thus reduces the wear of bristles 5.

Figure 6:
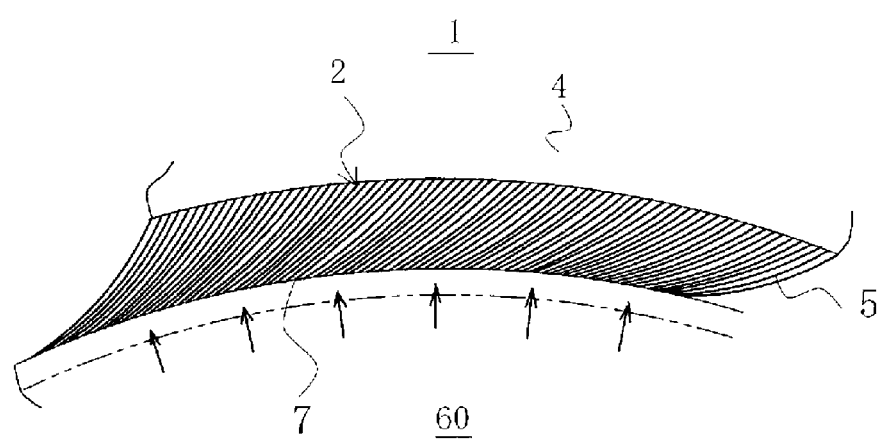
FIG. 6 is a front view of the brush seal in the condition in FIG. 1 where the rotational part is eccentrically shifted, as viewed from the high-pressure side

FIG. 6 is a front view of the brush seal 1 in the condition in FIG. 1 where the rotational part is eccentrically shifted, as viewed from the high-pressure side.

The brush seal 1 is such that, as the rotor 60 rotates and contacts the free end 7 of bristles 5 due to vibration, shaking, etc., the bristles 5 slant by a greater angle while being pressed against the rotor 60. Here, the bristles 6 have low rigidity in the direction orthogonal to the direction of pressure difference because degrees of freedom are ensured at the tips of individual bristles 5 in the direction orthogonal to the direction of pressure difference, and therefore the free end 7 can separate from the outer periphery surface of the rotor 60 due to the dynamic pressure even when the rotor 60 is rotating at low speed, which provides such benefits as reduced wear and improved wear resistance. Furthermore, the ability of the individual bristles 5, 15 to move independently of the conical vibration of the rotor 60 also helps reduce wear and improve wear resistance.

Also on the sliding surface of the circular bristle part 2 on the free end 7, multiple dynamic-pressure generating grooves 15 that generate dynamic pressure by rotating and sliding relative to the rotor 60 are formed independently in the circumferential direction in a manner connecting to the high-pressure side, and therefore the hydrodynamic force generated by the fluid shear force resulting from the rotation of the rotor 60 generates buoyancy in the bristles 5, which reduces the wear of bristles 5 further.

The operations and effects of the brush seal pertaining to the embodiment of the present invention are summarized below.

Since the multiple bristles arranged in the direction of pressure difference between the high-pressure end and low-pressure end are mutually fixed between the base end and free end and formed into planar bristles, rigidity is higher in the direction of pressure difference between the high-pressure end and low-pressure end (=axial direction of the rotor) compared to when conventionally known brush seal bristles are used, and this also allows for application to steam turbines and other high-pressure equipment.

In addition, the planar bristles 10 are such that degrees of freedom are ensured at the tips of individual bristles 5, or specifically at the tips of individual bristles 5 between the fixed part 8 close to the free end 7 and the free end 7, in the direction orthogonal to the direction of pressure difference (=circumferential direction), and therefore rigidity is low in the direction orthogonal to the direction of pressure difference and consequently the free end 7 can separate from the outer periphery surface of the rotor 60 due to the dynamic pressure even when the rotor 60 is rotating at low speed, which provides such benefits as reduced wear and improved wear resistance.

Furthermore, the ability of the tips of individual bristles 5 to move independently of the conical vibration of the rotor 60 also helps reduce wear and improve wear resistance.

Furthermore, since dynamic-pressure generating grooves 15 are formed on the sliding surface of the circular bristle part 2 on the free end 7, the hydrodynamic force generated by the fluid shear force resulting from the rotation of the rotor 60 generates a pumping force that pushes fluid back toward the high-pressure side, which reduces the leakage of sealed fluid. Furthermore, the generated hydrodynamic force collides against the slanted step 16 of the dynamic-pressure generating groove 15 to produce buoyancy in the bristles 5 and thus reduces the wear of bristles 5.

The foregoing explained an embodiment of the present invention using drawings, but specific constitutions hereof are not at all limited to this embodiment and changes and additions are also included in the present invention so long as they do not deviate from the purpose of the present invention.

For example, the embodiment explained methods to lower the heights of some bristles on the free end side, including a method to cut bristles in specified positions on the free end, as well as a method to prepare short bristles beforehand and then arrange them in specified positions, but the specific method is not at all limited to the foregoing and it is also possible, for example, to remove the free end side of bristles in specified positions using a laser.

Also, the embodiment explained a method to form dynamic-pressure generating grooves by arranging planar bristles sequentially, starting from planar bristles having many short bristles arranged on the high-pressure side and followed by planar bristles having fewer short bristles, but the specific method is not at all limited to the foregoing and it is also possible to form a circular bristle part and then irradiate a laser onto the sliding surface to form stepped concaves connected to the high-pressure side.

In addition, the embodiment explained bristles with a circular cross-section shape, but their cross-section shape is not at all limited to the foregoing and bristles having a triangle, polygon, oval, or other cross-section shape can also be used.

In addition, the embodiments explained a case where the bristles positioned side by side are fixed at three locations in the diameter direction between the base end and free end of multiple bristles arranged in a single row, for instance, but the fixed parts are not at all limited to the foregoing and other variations are also permitted as long as there is at least one fixed location. It is also possible to change the fixed position for each of the planar bristles arranged in the circumferential direction, to prevent fixed positions from concentrating at one location in the diameter direction.

REFERENCE SIGNS

1 Brush seal device
2 Bristle part
3 Back plate
4 Retention part
5 Bristle
6 Base end
7 Free end
8 Fixed part
10 Planar bristle
12 Snap ring
15 Dynamic-pressure generating groove
16 Step
50 Casing (stationary part)
51 Step
60 Rotor (rotational part)

The invention claimed is:

1. A brush seal for sealing fluid flowing between a stationary part and a rotational part, comprising:
a bristle part formed by multiple straight bristles attached to a stationary part between the stationary part and a rotational part that undergo relative motion by maintaining a space in between; and
a back plate attached adjacent to the bristle part on a low-pressure side to restrict movement of the bristle part,
wherein the bristle part is a circular bristle part formed by multiple discrete planar layers of bristles, which layers are stacked continuously in a circumferential direction,
each planar layer is constituted by multiple straight bristles, each of which extends in a radial direction, which are aligned side by side in a direction of pressure difference between a high-pressure side and low-pressure side, and which are mutually fixed at multiple places along the radially extending straight bristles between a base end and free end of the bristles to adjust flexibility at the free end of the planar layer, wherein the free end side of the planar layers forms a sliding surface of the bristle part; and
wherein the multiple straight bristles include short straight bristles whose length is shorter than the remaining bristles, said short straight bristles being disposed in the planar layers only on the high-pressure side in a manner forming multiple grooves in the sliding surface of the bristle part separately in the circumferential direction in a manner open to the high-pressure side and closed to the low-pressure side so that the grooves function as multiple dynamic-pressure generating grooves where dynamic pressure is generated when rotating and sliding the rotational part relative to the stationary part.

2. A brush seal according to claim 1, wherein the planar layers of bristles are arranged sequentially, starting from a planar layer of bristles having many short straight bristles that are arranged on the high-pressure side and gradually changing to planar bristles having fewer short straight bristles toward a rotating direction of the rotational part.

3. A brush seal according to claim 2, wherein each dynamic-pressure generating groove is triangular as viewed from a center of the circular bristle part wherein the dynamic-pressure generating groove has one side facing the high-pressure side and one other side slanting in a manner giving a component of force directed toward the high-pressure side to a flow generated by rotation of the rotational part, and the dynamic-pressure generating grooves are shaped in a stepped concave in side view.

* * * * *